United States Patent
Ma et al.

(10) Patent No.: US 10,233,311 B2
(45) Date of Patent: Mar. 19, 2019

(54) PREPARATION OF SILICA REINFORCED RUBBER CONTAINING STYRENE/BUTADIENE ELASTOMER, RUBBER COMPOSITION AND TIRE WITH COMPONENT

(71) Applicant: The Goodyear Tire & Rubber Company, Akron, OH (US)

(72) Inventors: Liqing Ma, Uniontown, OH (US); Bruce Raymond Hahn, Hudson, OH (US); George Jim Papakonstantopoulos, Medina, OH (US); Eric Sean Castner, Uniontown, OH (US); Dan Qu, Lyndhurst, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/211,299

(22) Filed: Jul. 15, 2016

(65) Prior Publication Data

US 2018/0016422 A1    Jan. 18, 2018

(51) Int. Cl.
| | |
|---|---|
| *C08K 5/548* | (2006.01) |
| *C08K 3/22* | (2006.01) |
| *C08K 3/06* | (2006.01) |
| *C08K 5/47* | (2006.01) |
| *C08K 5/31* | (2006.01) |
| *C08L 9/00* | (2006.01) |
| *B60C 1/00* | (2006.01) |
| *C08L 9/06* | (2006.01) |
| *C08K 3/04* | (2006.01) |
| *C08K 3/36* | (2006.01) |
| *C08L 7/00* | (2006.01) |
| *C08L 91/00* | (2006.01) |

(52) U.S. Cl.
CPC ............... *C08L 9/00* (2013.01); *B60C 1/00* (2013.01); *B60C 1/0016* (2013.01); *C08K 3/04* (2013.01); *C08K 3/06* (2013.01); *C08K 3/22* (2013.01); *C08K 3/36* (2013.01); *C08K 5/31* (2013.01); *C08K 5/47* (2013.01); *C08K 5/548* (2013.01); *C08L 7/00* (2013.01); *C08L 9/06* (2013.01); *C08L 91/00* (2013.01)

(58) Field of Classification Search
CPC ...... C08L 9/00; C08L 9/06; C08L 7/00; C08L 91/00; B60C 1/0016; B60C 1/00; C08K 3/04; C08K 3/06; C08K 3/22; C08K 3/36; C08K 5/31; C08K 5/47; C08K 5/548
USPC .......................................... 524/526
See application file for complete search history.

(56) References Cited

U.S. PATENT DOCUMENTS

| | | | |
|---|---|---|---|
| 6,433,065 B1 * | 8/2002 | Lin | ........................ B29B 7/7495 524/492 |
| 7,214,731 B2 | 5/2007 | Lanzig et al. | |
| 7,249,621 B2 | 7/2007 | Sandstrom | |
| 7,956,146 B2 | 6/2011 | Zhao et al. | |
| 8,445,580 B2 | 5/2013 | Zhao | |
| 2002/0045697 A1 * | 4/2002 | Sohnen | .................... C08K 5/01 524/492 |
| 2006/0266454 A1 | 11/2006 | Sandstrom et al. | |
| 2016/0168367 A1 | 6/2016 | Tahon et al. | |

FOREIGN PATENT DOCUMENTS

| | | |
|---|---|---|
| EP | 1398347 A1 | 3/2004 |
| EP | 2657262 A1 | 10/2013 |
| EP | 3000617 A1 | 3/2016 |

OTHER PUBLICATIONS

Technical Data Sheet for Calprene 1204, no date.*
EPO search report received by Applicant dated Oct. 26, 2017.

* cited by examiner

*Primary Examiner* — Angela C Scott
(74) *Attorney, Agent, or Firm* — Henry C. Young, Jr.

(57) ABSTRACT

The invention relates to preparation of a precipitated silica reinforced rubber composition which contains styrene/butadiene elastomer modified with a combination of bis(3-triethoxysilylpropyl) polysulfide silica coupler and mercaptoorganoalkoxysilane, a rubber composition thereof and a tire with a component of such rubber composition.

13 Claims, No Drawings

US 10,233,311 B2

PREPARATION OF SILICA REINFORCED RUBBER CONTAINING STYRENE/BUTADIENE ELASTOMER, RUBBER COMPOSITION AND TIRE WITH COMPONENT

FIELD OF THE INVENTION

This invention relates to preparation of a precipitated silica reinforced rubber composition which contains styrene/butadiene elastomer modified with a of bis(3-triethoxysilylpropyl) polysulfide silica coupler and mercaptoorganoalkoxysilane, a rubber composition thereof and a tire with a component of such rubber composition.

BACKGROUND OF THE INVENTION

Tires are sometimes desired having a component comprised of conjugated diene based elastomers and reinforcing filler comprised of precipitated silica. The precipitated silica is often blended with a silica coupler in the rubber composition to couple the precipitated silica to the diene-based elastomers.

An elastomer contained in the rubber composition may be a styrene/butadiene copolymer elastomer.

In one embodiment, the styrene/butadiene elastomer may be a functionalized styrene/butadiene elastomer in a sense of containing at least one functional group (e.g. at least one of siloxy, amine and thiol groups) reactive with hydroxyl groups (e.g. silanol groups) on the precipitated silica to aid in coupling the precipitated silica to the functionalized styrene/butadiene elastomer.

For this invention. it is desired to evaluate providing a functionalized styrene/butadiene elastomer by functionalizing an organic solution polymerization derived styrene/butadiene elastomer (S-SBR) to form a functionalized butadiene/styrene elastomer (Fn-SBR) by reacting the S-SBR in situ within a rubber composition with a minimal amount of mercaptoorganoalkoxysilane (MOAS) to thereby functionalize the styrene/butadiene elastomer within the rubber composition with alkoxysilane functional group of the mercaptoorganoalkoxysilane (MOAS) which is reactive with hydroxyl groups of the precipitated silica reinforcing filler contained in the rubber composition.

For this evaluation, a significant amount of primary silica coupler is also included in the rubber composition in a form of a bis(3-triethoxysilylpropyl) polysulfide (TEOSPS) for coupling diene-based elastomers, including said S-SBR and Fn-SBR in situ within said rubber composition with precipitated silica through hydroxyl groups on said precipitated silica.

For this evaluation, it is contemplated that the mercapto group of the MOAS can readily react with the S-SBR through its vinyl group of its butadiene portion to create Fn-SBR and the silane groups of both the MOAS and the TEOSPS can readily react independently with hydroxyl groups of the precipitated silica. It is contemplated that the polysulfide group of the TEOSPS can subsequently interact in situ with the diene-based elastomers, including the FN-SBR, under conditions of high rubber mixing temperature of the uncured rubber composition and the high curing temperature of the rubber composition.

For this evaluation, to promote a de-coupling of the interaction (e.g. to promote somewhat separated reactions) of the mercapto group of the MOAS with the S-SBR to form the FN-SBR, reaction of the silane groups of the MOAS, Fn-SBR and TEOSPS with the hydroxyl groups of the precipitated silica and interaction of the polysulfide of the TEOSPS with the diene-based elastomers in the rubber composition, only a minimal amount of the MOAS is used and a significant amount of the TEOSPS is employed in the rubber composition. For example, a ratio of the TEOSPS to MOAS in a range of from about 3/1 to about 30/1, alternatively 5/1 to 20/1, might be used.

For the preparation of the rubber composition, a mixing procedure is comprised of at least one preliminary mixing step, or stage, usually sequential mixing steps (one mixing step followed by a next mixing step), which are sometimes referred to as non-productive mixing steps. Such non-productive mixing steps do not contain sulfur curatives in a form of sulfur and sulfur vulcanization accelerators. Following the non-productive mixing step(s), a final mixing step is provided in which sulfur and sulfur vulcanization accelerator(s) are added to the rubber composition. Such final mixing step is referred to as a productive mixing step. In such productive mixing step, sometimes additional rubber ingredients are also added to the rubber composition as may be desired. Such preparation of rubber compositions by the aforesaid non-productive (NP) and productive (P) mixing steps is well known by those having skill in the rubber compounding art.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY AND PRACTICE OF THE INVENTION

In accordance with this invention, a method of preparing a rubber composition comprises the steps of blending a rubber composition comprised of parts by weight per 100 parts by weight rubber (phr) by:

(A) mixing in at least one sequential, non-productive, mixing step (mixing steps prior to a final productive mixing step and therefore in absence of sulfur curative comprised of sulfur and at least one sulfur vulcanization accelerator);
  (1) 100 phr of diene-based elastomers comprised of:
    (a) from about 10 to about 95, alternately from about 40 to about 80, phr of styrene/butadiene elastomer, and
    (b) about 90 to about 5, alternately from about 60 to about 20, phr of at least one additional conjugated diene-based elastomer,
  (2) about 0.1 to about 2, alternately from about 0.5 to about 1.5, phr of mercaptoorganoalkoxysilane (MOAS), desirably in a first sequential non-productive mixing step exclusive of a final productive mixing step,
  (3) reinforcing filler comprised of about 20 to about 120, alternately from about 50 to about 100, phr of precipitated silica and from about 1 to about 50, alternately from about 3 to about 30, phr of rubber reinforcing carbon black,
  (4) about 2 to about 15, alternately from about 5 to about 10, parts by weight of silica coupler per 100 parts by weight of said precipitated silica (phs) comprised of a bis(3-triethoxysilylpropyl) polysulfide (TEOSPS) containing an average of from about 2 to about 4, alternately from about 2 to about 2.6, connecting sulfur atoms in its polysulfidic bridge, and (E) mixing in a final productive mixing step rubber ingredients comprised of sulfur, and at least one sulfur vulcanization accelerator, wherein the ratio of TEOSPS to MOAS is in a range of from about 3/1 to about 30/1, alternatively about 5/1 to about 20/1, wherein the styrene/butadiene elastomer is an organic solution polymerization prepared elastomer as a copolymer of styrene and 1,3-butadiene monomers (S-SBR).

Thereafter, the rubber composition may be shaped and be cured at an elevated temperature to form a sulfur cured rubber article.

In one embodiment, the S-SBR contains a bound styrene content in a range of from about 10 to about 45 percent, alternately in a range of from about 15 to about 30 percent, and a vinyl content of at least 12, alternately in a range of from about 40 to about 70, percent based on its butadiene component.

While the mechanism is not fully understood, it is envisioned that the mercapto moiety of the MOAS interacts with the S-SBR, particularly the vinyl groups of the polybutadiene portion of the S-SBR by a thiol-ene reaction to thereby functionalize the styrene/butadiene elastomer with silane based functional groups of the MOAS which are reactive with hydroxyl groups of said precipitated silica to thereby aid in coupling the precipitated silica specifically to the S-SBR to form an in situ Fn-SBR. It is envisioned that the MOAS interacts with a vinyl groups of the S-SBR by thereby grafting onto or reacting with the butadiene portion of the S-SBR.

Representative of the mercaptoorganoalkyloxysliane (MOAS) is, for example, a compound of the Formula (I):

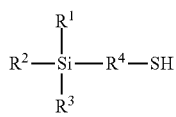

wherein $R^1$, $R^2$ and $R^3$ are comprised of at least one of alkyl and alkoxy groups containing from 1 to 12, alternately from 1 to 6, carbon atoms wherein at least one of said groups, and preferably all three of said groups, are alkoxy groups, and wherein, desirably at least one of said alkoxy groups is an ethoxy group, and wherein $R^4$ is an alkylene group containing from 1 to 18, alternately from 2 to 4, carbon atoms.

Representative of such MOAS are, for example, (3-mercaptopropyl)triethoxysilane (MPTES), (3-mercaptopropyl)trimethoxysilane (MPTMS), (2-mercaptoethyl)triethoxysilane (METES), (11-mercaptoundecyl)trimethoxysilane (MUDTMS), (3-mercaptopropyl) trimethyldiethoxysilane (MPMDES), (3-mercaptopropyl)methyldimethoxysilane (MPMDMS), (3-mercaptapropyl)trimethoxyethoxysilane (MPTMES), (3-mercaptopropyl)silatrane (MPSTR) and (3-mercaptopropyl)-3,7,10-trimethylsilatrane (MPTMSTR).

Such MOAS examples may, for example, be envisioned as being comprised of the following structures:

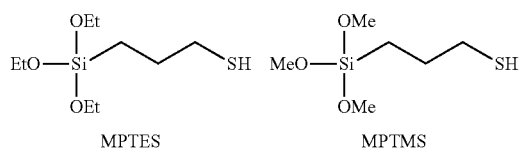

MPTES   MPTMS

-continued

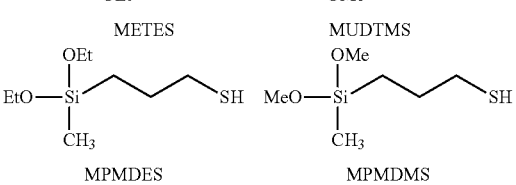

METES   MUDTMS

MPMDES   MPMDMS

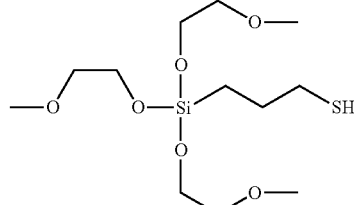

MPTMES

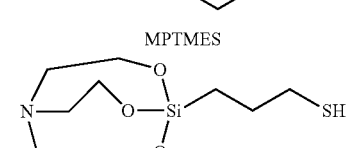

MPSTR

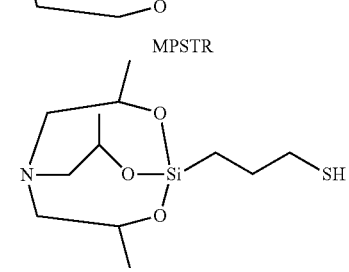

MPTMSTR wherein "Et" represents an ethyl radical, "S" represents sulfur, "Me" represents a methyl radical, "N" represents nitrogen and "O" represents oxygen.

In additional accordance with this invention, a rubber composition is provided having been prepared by the aforesaid method.

In additional accordance with this invention a tire is provided having a component, (e.g. a tire tread) comprised of said rubber composition.

In further accordance with this invention, said rubber composition and said tire are provided as being sulfur cured.

In one embodiment, said additional diene-based elastomer may be comprised of, for example, at least one of cis 1,4-polyisoprene and cis 1,4-polybutadiene rubber.

In one embodiment, any of the S-SBR and FN-SBR may be a tin or silicon coupled elastomer.

In one embodiment, said precipitated silica and bis(3-triethoxysilylpropyl) polysulfide silica coupling agent may be added to the rubber composition and reacted together in situ within the rubber composition.

The precipitated silica reinforcement may, for example, be characterized by having a BET surface area, as measured using nitrogen gas, in the range of, for example, about 40 to about 600, and more usually in a range of about 50 to about 300, square meters per gram. The BET method of measuring surface area might be described, for example, in the *Journal of the American Chemical Society*, (1938), Volume 60, as well as AS™ D3037.

Such precipitated silicas may, for example, also be characterized by having a dibutylphthalate (DBP) absorption value, for example, in a range of about 100 to about 400, and more usually in a range of from about 150 to about 300 cc/100 g.

Various commercially available precipitated silicas may be used, such as, and not intended to be limiting, silicas from PPG Industries under the Hi-Sil trademark with designations 210, 243, etc.; silicas from Solvay with, for example, designations of Zeosil 1165MP and Zeosil 165GR, silicas from Evonik with, for example, designations VN2 and VN3 and chemically treated precipitated silicas such as for example Agilon™ 400 from PPG.

Representative examples of rubber reinforcing carbon blacks are, for example, and not intended to be limiting, referenced in *The Vanderbilt Rubber Handbook*, 13$^{th}$ edition, year 1990 on Pages 417 and 418 with their AS™ designations. As indicated, such rubber reinforcing carbon blacks may have iodine absorptions ranging from, for example, 60 to 240 g/kg and DBP values ranging from 34 to 150 cc/100 g.

It is readily understood by those having skill in the art that the vulcanizable rubber composition would be compounded by methods generally known in the rubber compounding art. In addition, said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually, it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr.

Additional rubber processing oils, (e.g. petroleum based rubber processing oils) may be included in the rubber composition, if desired, to aid in processing vulcanizable rubber composition in addition to the vegetable oil such as soybean oil, wherein the vegetable oil is the majority (greater than 50 weight percent) of the vegetable oil and rubber processing oil.

Typical amounts of antioxidants may comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for example, about 1 to 5 phr. Typical amounts of fatty acids, if used, which can include stearic acid, comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The pneumatic tire may, for example, be a race tire, passenger tire, aircraft tire, agricultural tire, earthmover tire, off-the-road tire, truck tire and the like. Usually the tire is desirably a passenger or truck tire. The tire may also be a radial or bias ply tire, with a radial ply tire being usually desired.

Vulcanization of the pneumatic tire containing the tire tread of the present invention is generally carried out at conventional temperatures in a range of, for example, from about 140° C. to 200° C. Often it is desired that the vulcanization is conducted at temperatures ranging from about 150° C. to 180° C. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

EXAMPLE I

In this example, the following rubber compositions were prepared for the evaluation.

Control rubber Sample A was prepared with non-functionalized styrene/butadiene rubber (S-SBR) which does not contain functional groups capable of reacting with hydroxyl groups of precipitated silica. The rubber composition further contained natural rubber, precipitated silica reinforcing filler and silica coupler comprised of a bis(3-triethoxysilylpropyl) polysulfide.

The Control rubber Sample A was prepared by mixing the elastomers, reinforcing filler and silica coupler in three sequential non-productive mixing stages followed by a final productive mixing stage in which rubber curatives comprised of sulfur and vulcanization accelerator(s) are mixed with the rubber composition.

Experimental rubber Samples B, C, D and E were prepared by addition of a very small amount of 0.6 phr of (3-mercaptopropyl)triethoxysilane (MPTES, an MOAS) to Control rubber Sample A containing the S-SBR in three sequential non-productive mixing stages followed by a productive mixing stage for the rubber composition. The only variable for Experimental rubber Samples B, C, D and E was the stage of the addition of MPTES.

For Experimental rubber Sample B, the MOAS in the form of the MPTES was added in a first non-productive mixing stage (NP1).

For Experimental rubber Sample C, the MOAS in the form of the MPTES was added in a second non-productive mixing stage (NP2) subsequent to the first non-productive mixing stage.

For Experimental rubber Sample D, the MOAS in the form of the MPTES was added in a third non-productive mixing stage (NP3) subsequent to the second non-productive mixing stage.

For Experimental rubber Sample E, the MOAS in the form of the MPTES was added in a productive (P) mixing stage subsequent to the third non-productive mixing stage.

The rubber compositions are illustrated in the following Table 1.

TABLE 1

| | Parts by Weight (phr) MOAS (MPTES) mixing stage introduction | | | | |
|---|---|---|---|---|---|
| Material | None Cntrl A | NP1 Exp B | NP2 Exp C | NP3 Exp D | P Exp E |
| Non-Productive Mix Step (NP1) | | | | | |
| S-SBR[1] | 65 | 65 | 65 | 65 | 65 |
| Natural cis 1,4-polyisoprene rubber | 35 | 35 | 35 | 35 | 35 |
| Precipitated silica[2] | 58 | 58 | 58 | 58 | 58 |
| Silica coupler[3] | 4.3 | 4.3 | 4.3 | 4.3 | 4.3 |
| Fatty acids[4] | 3 | 3 | 3 | 3 | 3 |
| Carbon black (N550) | 3 | 3 | 3 | 3 | 3 |
| MOAS as MPTES[5] | 0 | 0.6 | 0 | 0 | 0 |
| Non-Productive Mix Step (NP2) | | | | | |
| Antioxidants | 2 | 2 | 2 | 2 | 2 |
| Rubber processing oil | 3 | 3 | 3 | 3 | 3 |
| Precipitated silica[2] | 15 | 15 | 15 | 15 | 25 |
| Silica coupler[3] | 1 | 1 | 1 | 1 | 1 |
| MOAS as MPTES[5] | 0 | 0 | 0.6 | 0 | 0 |
| Non-Productive Mix Step (NP3) | | | | | |
| MOAS as MPTES[5] | 0 | 0 | 0 | 0.6 | 0 |
| Productive Mix Step (P) | | | | | |
| MOAS as MPTES[5] | 0 | 0 | 0 | 0 | 0.6 |
| Zinc Oxide | 1.8 | 1.8 | 1.8 | 1.8 | 1.8 |

TABLE 1-continued

| | Parts by Weight (phr) MOAS (MPTES) mixing stage introduction | | | | |
|---|---|---|---|---|---|
| Material | None Cntrl A | NP1 Exp B | NP2 Exp C | NP3 Exp D | P Exp E |
| Sulfur | 1.8 | 1.8 | 1.8 | 1.8 | 1.8 |
| Sulfur cure accelerators[6] | 3.6 | 3.6 | 3.6 | 3.6 | 3.6 |

[1]Non-functionalized styrene/butadiene rubber (S-SBR) from Styron as SLR4601 ™ having a styrene content of about 21 percent and a Tg (glass transition temperature) of about −22° C., prepared by organic solution polymerization of styrene and 1,3-butadiene monomers by what it is understood to be a batch polymerization process
[2]Precipitated silica as Zeosil 1165MP ™ from Solvay
[3]Silica coupler comprised of a bis(3-triethoxysilylpropyl) polysulfide containing an average in a range of from about 2 to about 2.6 connecting sulfur atoms in its polysulfidic bridge as Si266 ™ from Evonik
[4]Fatty acids comprised of stearic, palmitic and oleic acids
[5](3-mercapto) propyltriethoxysilane (MPTES) from the Gelest Inc.
[6]Sulfur cure accelerators as sulfenamide primary accelerator and diphenylguanidine secondary accelerator The rubber Samples were prepared by the same mixing procedures, wherein the elastomers, antioxidant and portion of the precipitated silica and coupling agent, as well as other ingredients indicated in Table 1, were mixed together in a first non-productive mixing stage (NP1) in an internal rubber mixer for about 4 minutes to a temperature of about 160° C. The resulting mixtures were was subsequently mixed in a second sequential non-productive mixing stage (NP2) in an internal rubber mixer to a temperature of about 160° C. with the remainder of the precipitated silica, silica coupler and indicated ingredients. The rubber compositions were subsequently mixed in a productive mixing stage (P) in an internal rubber mixer with a sulfur cure package, namely sulfur and sulfur cure accelerator(s), for about 2 minutes to a temperature of about 115° C. The rubber compositions were each removed from its internal mixer after each mixing step and cooled to below 40° C. between each individual non-productive mixing stage and before the final productive mixing stage.

The MPTES was added, variously, in NP1, NP2, NP3 or P mixing stages.

The following Table 2 illustrates cure behavior and various physical properties of rubber compositions based upon the basic formulations of Table 1. Where cured rubber samples are reported, such as for the stress-strain, hot rebound and abrasion value, the rubber samples were cured for about 14 minutes at a temperature of about 160° C.

TABLE 2

| | MOAS (MPTES) mixing stage introduction | | | | |
|---|---|---|---|---|---|
| Properties | None Cntrl A | NP1 Exp B | NP2 Exp C | NP3 Exp D | P Exp E |
| Uncured storage modulus G' (kPa), | | | | | |
| 15% strain, 0.83 Hertz, 100° C. | 207 | 223 | 268 | 320 | 192 |
| Curing Rate (150° C.) | | | | | |
| T1[1], minutes | 3.3 | 2.9 | 3.1 | 3.2 | 1.8 |
| T90[2], minutes | 8.2 | 7.6 | 7.4 | 8.0 | 5.8 |
| Cured Storage Modulus G' (MPa) | | | | | |
| 1% strain, 11 Hertz, 100° C. | 1.4 | 1.3 | 1.3 | 1.4 | 1.4 |
| Modulus, ring, 300% (MPa) | 13.8 | 15.1 | 16.7 | 17.1 | 14.6 |

TABLE 2-continued

|  | MOAS (MPTES) mixing stage introduction | | | | |
|---|---|---|---|---|---|
| Properties | None Cntrl A | NP1 Exp B | NP2 Exp C | NP3 Exp D | P Exp E |
| Rolling resistance (RR) Laboratory Prediction | | | | | |
| Rebound, tested at 60° C., higher is better | 63 | 65 | 66 | 66 | 63 |
| Tan delta, 10% strain, 11 Hertz, 100° C., lower is better | 0.07 | 0.06 | 0.06 | 0.06 | 0.07 |
| Abrasion rate (Grosch medium), (mg/km), lower is better | 143 | 139 | 138 | 131 | 141 |

[1] T1 is a time in minutes for an increase in torque by a value of 1 dNm between a minimum torque of the rubber composition toward its maximum torque as measured by a moving die rheometer (MDR) at a test temperature of 150° C. applied to an uncured rubber composition sample. The T1 torque value is sometimes used to estimate whether the rate of curing of the rubber composition is significantly excessive to become a risk of pre-mature curing, or scorching, of the uncured rubber composition during its high temperature mixing stage(s). Desirably the time for T1 value is greater than 2.5 minutes to sufficiently reduce the risk of pre-mature curing (scorching) of the uncured rubber composition during its mixing.
[2] T90 is a time in minutes for the torque to reach 90 percent of a delta torque (90 percent of a difference in torque from a minimum torque value toward a maximum torque value) for the rubber composition at a test temperature of 150° C. It is generally considered to be an evaluation for an optimum cure time for the rubber composition and can be measured by a moving die rheometer (MDR).

A challenge is presented of whether the non-functionalized styrene/butadiene rubber can be functionalized in situ to become precipitated silica reactive by reaction with a very minimal amount of a mercaptoorganoalkoxysilane (MOAS), in the form of MPTES, without significantly increasing its uncured storage modulus G' and thereby without significantly changing its processing ability.

For such challenge, such evaluation is conducted by adding the MOAS in the form of a very small amount of the MPTES in the first, second or third non-productive mixing stages, namely NP1, NP2, NP3, or in the P mixing stage.

It can be seen from Table 2 that the compound (rubber composition) property, such as the rebound test at 60° C., was improved, for example, from a value of 63 to a value of 65 or 66 when the MPTES was added in a non-productive mixing stage. In contrast, there was no improvement for rolling resistance indicators (rebound or tan delta) when the MPTES was added in the productive mixing stage, as shown in Experiment E.

Further, the rate of curing of the rubber samples was observed to be affected when MPTES was added in the productive mixing stage. In Table 2, as indicated, an indication of risk of scorching (premature curing) of the uncured rubber compositions during mixing is reported in a form of the T1 at 150° C., namely a time in minutes for a measured increase in the delta torque value of 1 dNm. As indicated, desirably the time for T1 value is greater than 2.5 minutes at an evaluation (test) temperature of 150° C.

In Table 2, it can be seen that the value of T1 (150° C.) for the Control A (no added MOAS) is an acceptable 3.3 minutes and ranges from a normally acceptable 2.9 to 3.2 minutes for Experiment B, C and D where the MOAS was added in mixing stages NP1, NP2 or NP3, respectively. However, for the addition of the MOAS in the P mixing step (Experiment E), the T1 time is observed to be only 1.8 minutes which is considered to be an undesirably short time in a sense of presenting an unnecessary risk of undesirable scorching (undesirable pre-mature curing) of the uncured rubber composition during its high temperature mixing.

It is concluded that there was no performance benefit for the rubber composition when the MOAS (the MPTES) was added in the final productive mixing stage. Further, it is observed in Table 2 that the addition of MOAS in the productive mixing stage resulted in an undesirably short T1 time, thereby presenting an undesirable risk of scorching the uncured rubber composition during its mixing.

It can also be seen from Table 2 that the most efficient result, (with the least increase in the uncured storage modulus (G'), was obtained by addition of the MOAS (MPTES) in the NP1 mixing stage followed by subsequent continued mixing of the MOAS-containing rubber composition in sequential mixing stages NP2 and NP3. The uncured storage modulus (G') is generally used as an indicator for the processability of uncured rubber compositions. A lower storage modulus (G') is an indication of better (more efficient) processability of an uncured rubber composition.

While the mechanism may not be completely understood, it is hypothesized that the mercapto moiety of the small amount of the MOAS (MPTES) grafts onto the polymer backbone of the S-SBR through thiol-ene reaction with its butadiene component, and the silane moiety of the small amount of the MOAS (MPTES) reacts with hydroxyl groups of the precipitated silica. Such interaction will likely increase the viscosity of the rubber composition which is related to the increased storage modulus (G') of the uncured rubber composition. By addition of the small amount of the MOAS (MPTES) in the NP1 mixing stage, the resulting increase in viscosity of the rubber composition is apparently reduced by increasing its mixing time during subsequent mixing stages of the MOAS-containing rubber composition. In other words, the MOAS-containing rubber composition is apparently subsequently broken down in the subsequent non-productive mixing stages to thereby reduce its viscosity and associated uncured storage modulus (G') property and thereby improve the processability of the rubber composition as observed by its associated uncured storage modulus (G') value.

It is concluded that it has been discovered that the order of addition of a small amount (0.6 phr) of a mercaptoorganoalkoxysilane (MOAS in the form of the MPTES) to precipitated silica filled, non-functionalized styrene/butadiene rubber-containing rubber composition in the NP1 mixing stage has a significant impact on the cured physical properties of the final compounds (rubber compositions), as well as the processability of the uncured rubber compositions.

EXAMPLE II

In this example, the following rubber compositions were prepared for the evaluation.

Control rubber Sample I contained functionalized styrene/butadiene rubber (Fn-SBR) and cis 1,4-polybutadiene elastomers together with reinforcing filler comprised of precipitated silica reinforcement and silica coupler comprised of bis(3-triethoxysilylpropyl) polysulfide (TEOSPS).

Experimental rubber Sample J was similar to Control rubber Sample I except it contained S-SBR instead of the functionalized styrene/butadiene rubber (FN-SBR).

Experimental rubber Sample K was similar to Experimental rubber Sample J except it contained 0.6 phr of MOAS in a form of (3-mercaptopropyl)triethoxysilane (MPTES) in NP1 mixing stage which amounts to 0.92 parts by weight of the MOAS (MPTES) per 100 parts by weight of the precipitated silica.

The rubber compositions are illustrated in the following Table 3.

TABLE 3

| | Parts by Weight (phr) MOAS (MPTES) mixing stage introduction | | |
|---|---|---|---|
| | none | none | NP1 |
| Materials | Cntrl I | Exp J | Exp K |
| Non-Productive Mix Step (NP1) | | | |
| Fn-SBR[1] | 70 | 0 | 0 |
| Cis 1,4-polybutadiene rubber[2] | 30 | 30 | 30 |
| S-SBR[3] | 0 | 70 | 70 |
| MPTES[4] | 0 | 0 | 0.6 |
| Precipitated silica[5] | 50 | 50 | 50 |
| Fatty acids[7] | 2 | 2 | 2 |
| Carbon black (N550) | 4 | 4 | 4 |
| Antioxidants | 2 | 2 | 2 |
| Non-Productive Mix Step (NP2) | | | |
| Precipitated silica[5] | 15 | 15 | 15 |
| Silica coupler[6] | 5.2 | 5.2 | 5.2 |
| Productive Mix Step (P) | | | |
| Zinc oxide | 2 | 2 | 2 |
| Sulfur | 1.7 | 1.7 | 1.7 |
| Sulfur cure accelerators[8] | 3 | 3 | 3 |

[1]Functionalized styrene/butadiene rubber (Fn-SBR) containing functional groups reactive towards hydroxy groups of silica filler, and prepared by organic solution polymerization of styrene and 1,3-butadiene monomers, having a Tg of about −23° C. and Mooney viscosity (ML1 + 4), 100° C., of about 65 as SLR4602 ™ from Styron
[2]High cis 1,4-polybutadiene rubber as BUD4001 ™ from The Goodyear Tire & Rubber Company having a Tg of about −102° C.
[3]Non-Functionalized styrene/butadiene rubber (S-SBR) from The Goodyear Tire & Rubber Company as produced by solvent solution polymerization of styrene and 1,3-butadiene monomers in a batch reactor polymerization process and having a styrene content of about 21 percent and a Tg (glass transition temperature) of about −22° C.
[4](3-mercapto) propyltriethoxysilane (MPTES) from the Gelest Inc.
[5]Precipitated silica as Zeosil 1165MP ™ from Solvay
[6]Silica coupler comprised of a bis(3-triethoxysilylpropyl) polysulfide containing an average in a range of from about 2 to about 2.6 connecting sulfur atoms in its polysulfidic bridge as Si266 from Evonik
[7]Fatty acids comprised of stearic, palmitic and oleic acids
[8]Sulfur cure accelerators as sulfenamide primary accelerator and diphenylguanidine secondary accelerator The rubber Samples were prepared in the manner of Example I.

The following Table 4 illustrates cure behavior and various physical properties of rubber compositions based upon the basic formulation of Table 1 and reported herein as Control rubber Sample I, and Experimental rubber Samples J and K where cured rubber samples are reported, such as for the stress-strain, hot rebound and abrasion values, the rubber samples were cured for about 14 minutes at a temperature of about 160° C.

TABLE 4

| | Parts by Weight (phr) MOAS (MPTES) mixing stage introduction | | |
|---|---|---|---|
| | none | none | NP1 |
| | Cntrl I | Exp J | Exp K |
| Materials | | | |
| Fn-SBR | 70 | 0 | 0 |
| Cis 1,4-polybutadiene rubber | 30 | 30 | 30 |
| S-SBR | 0 | 70 | 70 |
| MOAS (MPTES) | 0 | 0 | 0.6 |
| Precipitated silica | 65 | 65 | 65 |
| Silica coupler | 5.2 | 5.2 | 5.2 |
| Properties | | | |
| Cured storage modulus G'(MPa) | | | |
| 1% strain, 11 Hertz, 100° C. | 1.8 | 2.9 | 1.8 |
| Modulus, ring, 300% (MPa) | 10.3 | 9.4 | 10.4 |

TABLE 4-continued

| | Parts by Weight (phr) MOAS (MPTES) mixing stage introduction | | |
|---|---|---|---|
| | none | none | NP1 |
| | Cntrl I | Exp J | Exp K |
| Rolling Resistance (RR) Laboratory Prediction | | | |
| Rebound at 60° C., higher is better | 65 | 57 | 64 |
| Tan delta, 10% strain, 11 Hertz, 100° C., lower is better | 0.10 | 0.13 | 0.11 |
| Abrasion rate (Grosch Medium) (mg/km), lower is better | 109 | 115 | 103 |

From Table 4, it can be seen that storage modulus G' at 1 percent strain of Experimental rubber Sample K which contained the combination of S-SBR and small amount of MOAS (MPTES) was significantly reduced to a value of 1.8 MPa compared to a value of 2.9 MPa for Experimental rubber Sample J which contained the S-SBR without the MOAS (MPTES).

Further, it is seen that with the addition of the small amount of MOAS (MPTES), the storage modulus G' at 1 percent of Experimental rubber Sample K with a value of 1.8 MPa is similar to that of Control rubber Sample I with a value of 1.8 MPa which used the functionalized S-SBR.

It is important to appreciate that a lower storage modulus G' at 1 percent value is generally used as indicator of better filler dispersion within the rubber composition for similar rubber compositions.

From Table 4, it can further be seen that rolling resistance laboratory indicators, namely rebound at 60° C. and tan delta at 10 percent strain/100° C., values are significantly improved to values of 64 (an increased rebound value) and 0.11 (a decreased tan delta value) for Experimental rubber Sample K (which used the small amount of MPTES with the S-SBR), compared to values of 57 and 0.13, respectively, for Experimental rubber Sample J which did not contain the MPTES.

From Table 4 it can be additionally seen that the Grosch rate of abrasion value of 103 mg/km for Experimental rubber Sample K indicated that abradability of Experimental rubber Sample K significantly improved with the addition of the small amount of MPTES, compared to Experimental rubber Sample J with a significantly higher Grosch rate of abrasion value of 115 mg/km. The Grosch rate of abrasion of Experimental rubber Sample K (103 mg/km) also shows improvement over Control rubber sample I (109 mg/km) which used the functionalized SBR.

It is thereby concluded that this evaluation has resulted in a significant discovery that an addition of MPTES in a small quantity (0.6 phr) to the silica-rich reinforcing filler containing rubber compositions containing non-functionalized SBR resulted in a beneficial promotion of the indicated improved physical properties of the cured rubber compositions. In particular, surprisingly, the indicated physical properties for the rubber compositions with a combination of the MPTES and S-SBR were equal or improved over the physical values of the rubber composition obtained with the Fn-SBR without the addition of the MPTES.

It will be apparent to those skilled in this art that various changes and modifications may be made therein without departing from the spirit or scope of the invention.

What is claimed is:

1. A method of preparing a precipitated silica reinforced rubber composition comprised of blending a rubber composition comprised of parts by weight per 100 parts by weight rubber (phr) by:
   (A) mixing in at least one sequential preliminary, non-productive, mixing step in the absence of sulfur curative,
      (1) 100 phr of diene-based elastomers comprised of:
         (a) from about 10 to about 95 phr of styrene/butadiene elastomer, and
         (b) about 90 to about 5 phr of at least one additional conjugated diene-based elastomer,
      (2) about 0.1 to about 2 phr of mercaptoorganoalkoxysilane (MOAS) to thereby functionalize said styrene/butadiene elastomer with said MOAS;
   (B) thereafter mixing with the rubber composition containing the functionalized styrene/butadiene elastomer a combination of about 20 to about 120 phr of precipitated silica together with about 2 to about 15 parts by weight silica coupler per 100 parts by weight of the precipitated silica (phs) where the silica coupler is comprised of a bis(3triethoxysilylpropyl) polysulfide (TEOSPS) containing an average of from about 2 to about 4 connecting sulfur atoms in its polysulfidic bridge to thereby react with the silane groups of the MOAS functionalized styrene/butadiene rubber and with hydroxyl groups of the precipitated silica; and
   wherein the weight ratio of the TEOSPS to MOAS is in a range of from about 5/1 to about 20/1, followed by
   (C) mixing with the product of said preliminary, non-productive mixing steps in a final productive mixing step sulfur curative comprised of sulfur and at least one sulfur vulcanization accelerator,
   wherein, said styrene/butadiene elastomer is an organic solution polymerization prepared elastomer as a copolymer of styrene and 1,3-butadiene monomers (S-SBR) which contains a bound styrene content in a range of from about 15 to about 40 percent and a vinyl content, based on the polybutadiene portion of the styrene/butadiene rubber in a range of from about 40 to about 70 percent.

2. The method of claim 1 wherein said MOAS is comprised of at least one of (3-mercaptopropyl)triethoxysilane (MPTES), (3-mercaptopropyl)trimethoxysilane (MPTMS), (2-mercaptoethyl) triethoxysilane (METES), (11-mercaptoundecyl) trimethoxysilane (MUDTMS), (3-mercaptopropyl)trimethyldiethoxysilane (MPMDES), (3-mercaptopropyl) methyldimethoxysilane (MPMDMS), (3-mercaptopropyl) trimethoxyethoxysilane (MPTMES), (3-mercaptopropyl) silatrane (MPSTR) and (3-mercaptopropyl)-3,7,10-trimethylsilatrane (MPTMSTR).

3. The method of claim 2 wherein said rubber composition contains from about 1 to about 50 phr of rubber reinforcing carbon black wherein said carbon black is mixed with said rubber composition in at least one of said sequential preliminary, non-productive mixing steps.

4. The method of claim 1 wherein said rubber composition contains from about 1 to about 50 phr of rubber reinforcing carbon black wherein said carbon black is mixed with said rubber composition in at least one of said sequential preliminary, non-productive mixing steps.

5. A rubber composition prepared by the method of claim 1.

6. A rubber composition prepared by the method of claim 2.

7. A rubber composition prepared by the method of claim 3.

8. A rubber composition prepared by the method of claim 4.

9. A tire having a tread comprised of a rubber composition prepared by the method of claim 1.

10. A tire having a component comprised of the rubber composition of claim 5.

11. A tire having a component comprised of the rubber composition of claim 6.

12. A tire having a component comprised of the rubber composition of claim 7.

13. A tire having a component comprised of the rubber composition of claim 8.

* * * * *